CO-ORDINATE ADDRESSED MATRIX MEMORY

Filed Oct. 22, 1962 4 Sheets-Sheet 1

Feb. 27, 1968 G. N. HOUNSFIELD 3,371,325

CO-ORDINATE ADDRESSED MATRIX MEMORY

Filed Oct. 22, 1962 4 Sheets-Sheet 2

Feb. 27, 1968 G. N. HOUNSFIELD 3,371,325

CO-ORDINATE ADDRESSED MATRIX MEMORY

Filed Oct. 22, 1962 4 Sheets-Sheet 4

3,371,325

CO-ORDINATE ADDRESSED MATRIX MEMORY

Godfrey Newbold Hounsfield, South Muskham, near Newark, England, assignor to Electric & Musical Industries Limited, Middlesex, England, a company of Great Britain Filed Oct. 22, 1962, Ser. No. 232,037
Claims priority, application Great Britain, Nov. 4, 1961, 39,564/61
21 Claims. (Cl. 340—174)

Figure 1:
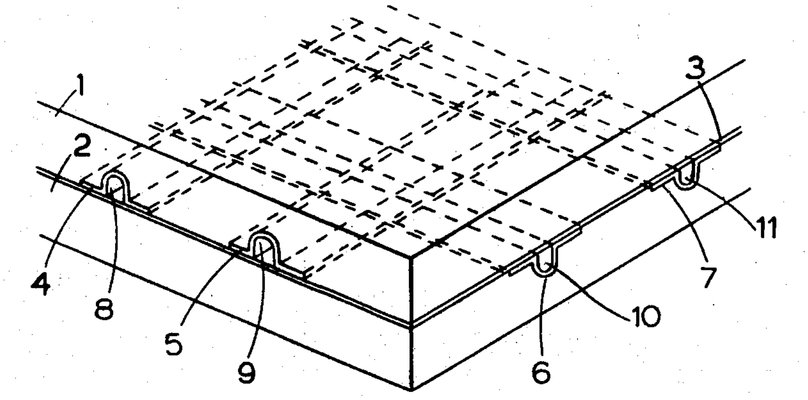

The present invention relates to data storage devices and especially but not exclusively to large random access stores such as would be used in digital computers.

The magnetic core matrix store is often used to provide large capacity random access storage but it suffers from certain disadvantages. Since the cores are usually of toroidal form so that the wires coupling to them have to be threaded through the core and sometimes as many as 500,000 cores are employed in a single store, the construction of the store is an expensive and time-consuming task. Furthermore, owing to the lack of rectangularity of the hysteresis loop of the material used to make the cores and because coincident current techniques are used for selection of the individual cores, spurious pulses are produced from a large number of unselected cores coupled to the driven windings, which spurious pulses combine to confuse the information from the selected core. As the size of the store increases the interference due to the spurious pulses increases so that the maximum size of the store is limited by the spurious pulses.

It is among the objects of the present invention to provide a data store in which the above disadvantages are reduced.

According to one aspect of the present invention there is provided a data storage device comprising an array of magnetic storage elements in rows and columns, a set of row conductors each for a respective row of the array and magnetically coupled to the elements of that row, a set of column conductors each for a respective column of the array and coupled to the elements of that column, means for applying a first electrical pulse to a selected column conductor, means for applying a second concurrent electrical pulse to a selected row conductor and means connected to said column conductors to derive therefrom an output signal induced in the selected column conductor in response to a reversal of magnetic state of the element coupled to the selected conductors and produced by the presence of both pulses, the pulses being so timed that the leading edge of the second pulse is delayed relative to the leading edge of the first pulse so that the voltage on the selected column conductor can have attained its steady state when said reversal of magnetic state occurs.

According to a second aspect of the present invention there is provided a data storage device comprising an array of storage elements arranged in rows and columns, a set of row conductors one for each row of the array, a set of column conductors one for each column of the array, means for applying a first electrical waveform to a selected column conductor, means for applying a second electrical waveform to a selected row conductor, said first electrical waveform including a pulse which at least partly overlaps a pulse included in said second electrical waveform, each storage element being such that in response to the coincident presence of said overlapping pulses in the respective row and column conductors the element can produce an output signal indicative of output signals stored in the element, an output conductor, and means including gates operated in timed relationship with said waveforms to couple said output conductor to the elements of the selected column but not of other columns of the array at such time that said output signal (if produced) is applied to said output conductor undisturbed by unwanted signals of elements of other columns.

Figure 2:
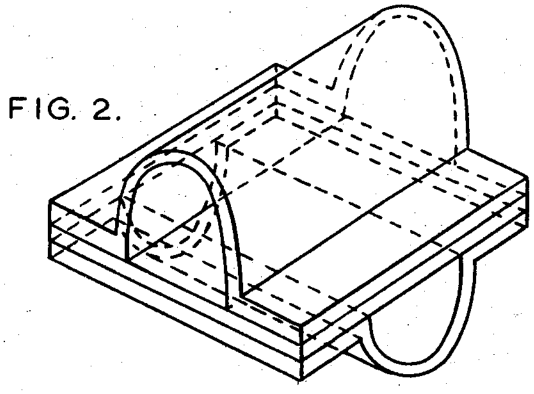
Figure 3:
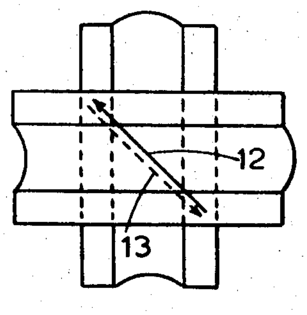
Figure 5:
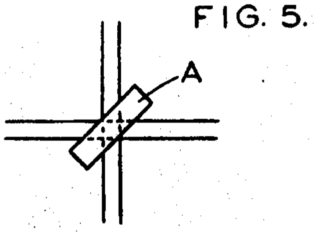
Figure 6:
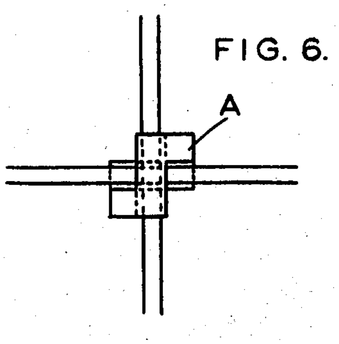
Figure 7:
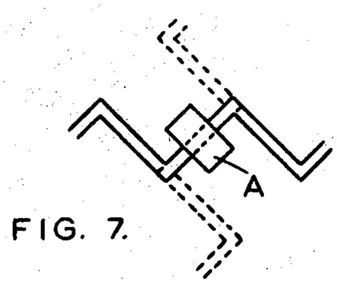
Figure 8:
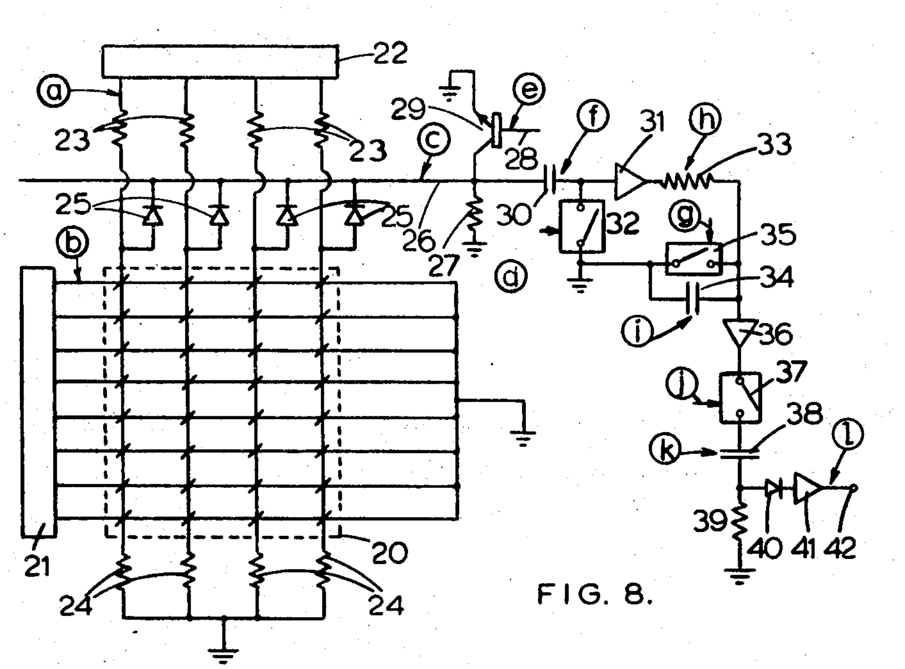
Figure 10:
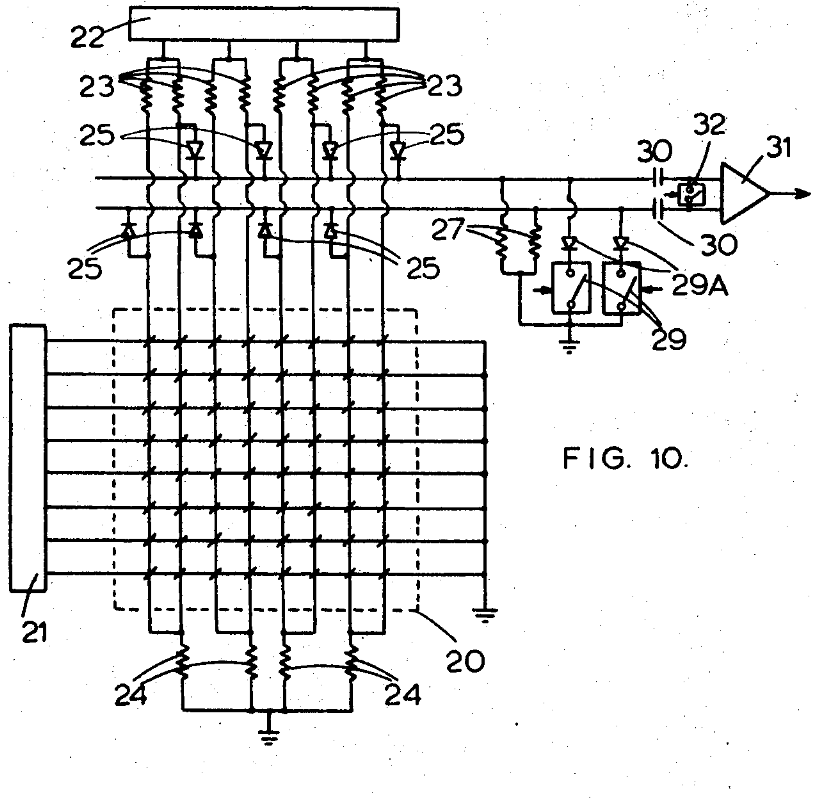
Figure 9:
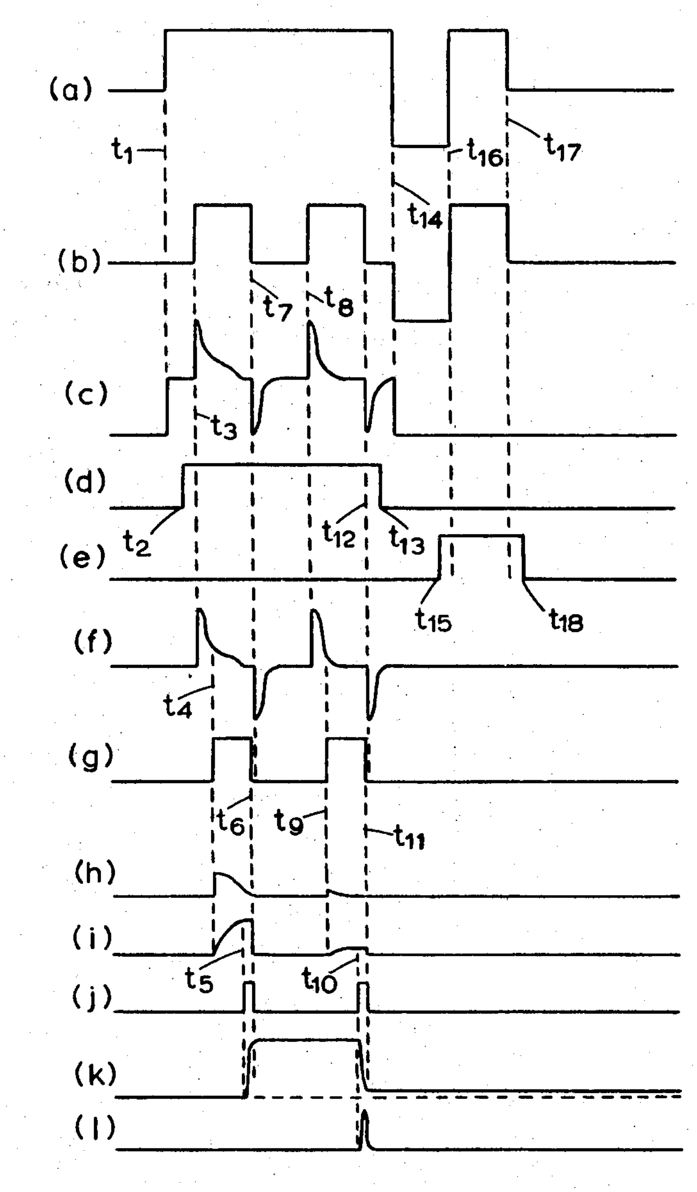

In order that the invention may be fully understood and readily carried into effect it will now be described in greater detail with reference to the accompanying drawings, of which:

FIGURE 1 represents a perspective view of part of an example of an array of storage elements, FIGURE 2 represents on a larger scale a storage element of the device shown in FIGURE 1, FIGURE 3 is a diagram explanatory of the operation of the storage element shown in FIGURE 2, FIGURES 4, 5, 6 and 7 are diagrams of examples of alternative storage elements, FIGURE 8 is a circuit diagram of a storage device according to one example of the invention, FIGURES 9(*a*) to (*l*) inclusive are graphs explanatory of the operation of the circuit of FIGURE 8, and FIGURE 10 is an alternative circuit diagram of a storage device to the arrangement shown in FIGURE 7 in which each storage element consists of two separate magnetic elements.

Referring to FIGURE 1, the array comprises two similar sheets of glass 1 and 2 separated by a thin sheet of insulation material 3 which is preferably magnetic. Each sheet of glass has recessed into it a number of parallel channel section strips of magnetic material such as 4, 5, 6 and 7 and copper conductors, such as 8, 9, 10 and 11, within the curved part of the section. The glass sheets are placed together so that the two sets of magnetic strips and conductors are orthogonal. In this way, there is formed at each crossover of the magnetic strips a magnetic element of the form shown in FIGURE 2.

The glass sheets may, for example, be manufactured in the following way. A number of parallel grooves are etched in a plane glass sheet, each groove having a suitable cross-section. A thin layer of chrome-silver is evaporated onto the glass and then plated with nickel iron in a magnetic field followed by the deposition of a thick layer of copper sufficient to fill up the grooves. The sheet is then lapped down to glass, leaving the separate flanged magnetic strips and the copper conductors within them inside the grooves.

In an alternative method of manufacture of the flanged strips of magnetic material, U-shaped grooves are etched in the glass which is then plated with nickel iron and copper as described above but instead of lapping down to glass the copper is cut down to the nickel iron layer but the nickel iron layer itself is left on the glass sheets and then cut into separate strips by etching between the grooves. As a further alternative the grooves may be cut in plates of ferrite with the copper conductors formed in the grooves.

Figure 4:
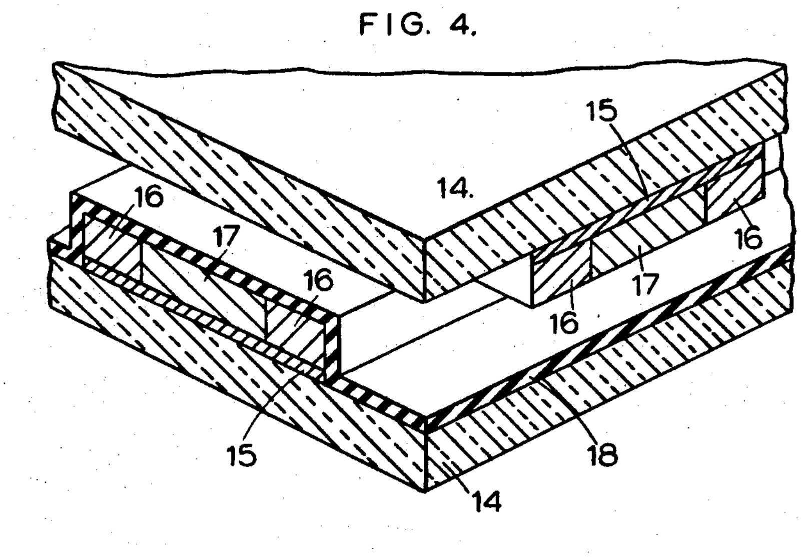

An arrangement alternative to that shown in FIGURE 1 is shown in FIGURE 4, in which grooves are not formed in the glass, but separate channels of magnetic material are made on the surface of the glass, the channels being filled with a conductor such as copper. The channels of magnetic material may conveniently be manufactured by depositing a continuous film of, say, nickel iron, on to one surface of a glass sheet 14, building up the sides 16 of the channels with more nickel iron deposited through a resist, filling the channel with a copper conductor 17 and finally etching the film into separate strips 15. As shown in FIGURE 4, two glass sheets are placed with the treated surfaces facing, one being covered with an insulating film 18, to form the array of storage elements.

The magnetic field used during the deposition of the nickel iron is arranged at 45° to the direction of the grooves in the plane of the glass sheet so that the magnetic material is uniaxially anisotropic having an easy axis of magnetisation in that direction. In the case of the arrangement shown in FIGURE 4 only the continuous film of magnetic material need be deposited in a magnetic field. When the two glass sheets are placed together the magnetic material at the cross-over points then forms a magnetic circuit in the direction of the easy axes of both magnetic strips which are, of course, arranged to be parallel, the magnetic circuit surrounding both conductors at the cross-over point. In FIGURE 3 the two easy axes are shown as arrows 12 and 13.

An advantage of depositing the magnetic material in a magnetic field lies in the fact that the hysteresis loop of the magnetic material in the direction of the easy axes of magnetisation is more rectangular than it would be if the material had been deposited in on magnetic field. Furthermore, to obtain the best hysteresis loop for the storage elements it is important that the insulating layer 3 should be as thin as possible.

It will be appreciated that it is not necessary for the magnetic strips of the two sheets to be at right angles to one another, angles as small as 30° being tolerable, in which case the orientation of the easy axes should be suitably varied, so that the easy axes are parallel when the sheets are placed together.

Although straight channels or grooves are shown in FIGURES 1 and 4 one or both sets of channels or grooves may be of zig-zag shape so that alternate sections of the channels or grooves of one set are parallel to and overlie those of the other set.

FIGURES 5, 6 and 7 are examples of some alternative arrangements for the magnetic elements of FIGURES 1 and 4 in which the continuous strips of magnetic material are replaced by suitably shaped elements A of flanged or channel section. In FIGURES 5 and 6 the elements are arranged diagonally at the intersection of the conductors and in FIGURE 7 the conductors have a zig-zag form so that the conductors through any element are parallel. These elements may be produced by ruling and etching or photo-etching. Other suitable shapes for the elements and configurations for the grooves or channels will be evident to those skilled in the art.

In the operation of the arrangements described above with reference to FIGURES 1 to 7, the "1" and "0" states of an element are represented by magnetisation in opposite directions around the loop defined by the easy axes of magnetisation of the two strips.

Referring now to FIGURE 8, which is a circuit diagram of a data storage device according to one example of the invention which is suitable for use with the arrays shown in FIGURES 1 and 4, or may be adapted for use with other types of matrix store, a four column by eight row array 20 of the magnetic elements is shown, the dotted line representing the glass sheets 1 and 2 or 14. Each element has two remanent magnetic states designated "1" and "0"; read out from any element is effected by setting it to the "0" state, and observing whether any change of magnetic state of the element occurs. A row drive selector 21 is connected to the eight row conductors of the array 20 to pass a half strength current through a selected one of the row conductors. A column drive selector 22 is connected to the four column conductors of the array 20 to pass a half strength current through a selected one of the column conductors. The selector 22 is connected via resistances 23 to the column conductors, which are connected via further resistances 24 to ground. The junctions of the resistances 23 and the respective column conductors are connected via individual diodes 25 to an output conductor 26. The conductor 26 is connected via a load resistance 27 to ground, via the emitter-collector path of a transistor 29 to ground the path being rendered conducting or non-conducting in response to signals applied to its base by means of connection 28, and via the condenser 30 to the input terminal of the read amplifier 31. The amplifier 31 is assumed to have a second input terminal which is grounded so that the input of the amplifier 31 is short circuited when the muting switch 32 connected from the input terminal of the amplifier 31 to ground is closed.

The output terminal of amplifier 31 is connected via the resistor 33 to the input terminal of amplifier 36, which input terminal is connected to ground by condenser 34 and switch 35, in parallel. The output terminal of amplifier 36 is connected via switch 37, condenser 38 and diode 40 in series to the input of amplifier 41. The junction of condenser 38 and diode 40 is connected to ground by resistor 39. The output of the amplifier 41 is applied to the output terminal 42. The amplifiers 31, 36 and 41 have second input and output terminals not shown in the drawing, which are connected to ground. The diode 40 may be rendered unnecessary by suitable biassing of the amplifier 41.

The operation of the circuit arrangement shown in FIGURE 8 will be described with reference to the waveforms shown in FIGURE 9.

FIGURE 9(*a*) shows the column drive waveform produced by the column drive circuits 22 and applied to a selected one of the column conductors of the matrix 20.

FIGURE 9(*b*) shows the row drive waveform produced by the row drive circuits 21 and applied to a selected one of the row conductors of the matrix 20, FIGURE 9(*c*) shows the signal on the conductor 26, FIGURE 9(*d*) shows the operating waveform for the muting switch 32, the waveform showing that the switch 32 is open-circuited from $t_2$ to $t_{13}$, FIGURE 9(*e*) shows the inverse of the voltage applied to the base conductor 28 of the transistor 29, the transistor 29 being conducting from $t_{15}$ to $t_{18}$, FIGURE 9(*f*) shows the input signal to the amplifier 31, FIGURE 9(*g*) shows the operating cycle of the switch 35, the switch being open-circuit between $t_4$ and $t_6$ and between $t_9$ and $t_{11}$, FIGURE 9(*h*) shows the part of the output signal which is applied to the condenser 34, FIGURE 9(*i*) shows the voltage set up across the condenser 34 by current through the resistor 33 together with the effect of the switch 35, FIGURE 9(*j*) represents the operating cycle of the switch 37, the switch being closed so as to pass current from $t_5$ to $t_6$ and from $t_{10}$ to $t_{11}$, FIGURE 9(*k*) is the waveform of the voltage across the condenser 38, and FIGURE 9(*l*) is the output signal of the amplifier 41 at the output terminal 42, this signal being a measure of the positive currents through resistor 39.

The encircled reference letters in FIGURE 8 correspond to the figure references in FIGURE 9 showing the waveform or operating cycle appropriate to that part of the circuit of FIGURE 8. The times $t_1$ to $t_{18}$ marked in FIGURE 9 do not necessarily indicate the actual relative durations of the various waveforms, but merely serve to show the order in which operations occur in FIGURE 8 and are used as aids in describing the operation of the circuit.

The switch 32 being closed until $t_2$, as shown in FIGURE 9(*d*), thus muting the amplifier 31, the column drive waveform, FIGURE 9(*a*) is applied to the selected column conductor by the selector 22 the positive going portion of which waveform, between $t_1$ and $t_{14}$ being such as to set up in the elements coupled to the selected column conductor a magnetic flux of half the magnitude required to change their magnetic states from "1" to "0." Because of the resistor 24 the anode of the diode 25 is raised above earth potential, thus causing current to flow through the diode 25 and the resistance 27. This current raises the potential of the line 26, FIGURE 9(*c*), biassing back the remaining diodes 25 so that no signal will appear on the line 26 from any column conductor other than the selected conductor. The switch 32 is opened at $t_2$ and the row drive waveform, FIGURE 9(*g*), of which the positive going portion between $t_3$ and $t_7$ is such as to set up in elements coupled to the selected row conductor a magnetic flux of half the magnitude required to change their states from "1" to "0," is applied at $t_3$ to the selected row conductor of the array 20 by the selector 21 thus driving the element at the intersection of the selected row and column conductors to the "0" state to effect destructive read out of the information stored in the element. The voltage induced in the column conductor as a result of the effect of the pulse in the row drive waveform, FIGURE 9(*b*), between $t_3$ and $t_7$ on the element at the intersection of the selected conductors causes a change in the potential of line 26, as shown in FIGURE 9(*c*), and therefore appears as a pulse at the input to the amplifier 31, FIGURE 9(*f*). Only the element at the intersection of the selected conductors changes state because both column and row drive waveforms are of half strength, that is to say, by themselves they cannot change the state of an element, but when added to another the sum of the signals is sufficient to cause the change of state.

The portion of the signal 9(*f*) between $t_3$ and $t_7$ represents the signal produced by a selected element initially in the "1" state, it differing from that produced by an element in the "0" state in the section between $t_4$ and $t_6$ as a result of the energy produced by the change in magnetic state of the material of the selected element involved in a change from the "1" state to the "0" state.

The row drive waveform, FIGURE 9(*b*), has a second positive pulse from $t_8$ to $t_{12}$, similar to that from $t_3$ to $t_7$ which interrogates the selected element a second time. Since the element was driven to the "0" state by the pulse of the row drive between $t_3$ and $t_7$, in combination with the column drive, and it has not been set to the "1" state, the portion of the output signal FIGURE 9(*f*) from $t_8$ to $t_{12}$ is that due to the interrogation of an element in the "0" state. A comparison between the portion of signal shown in FIGURE 9(*f*) from $t_4$ to $t_6$ and the portion between $t_9$ and $t_{11}$ shows the difference between the output signal from an element in the "1" state and an element in the "0" state. Of course, if the selected element had been initially in the "0" state before $t_1$, then the two portions of the signal shown in FIGURE 9(*f*) would have been identical.

The amplifier 31 amplifies the signal applied to its input, FIGURE 9(*f*), and feeds it via the resistor 33 into the integrating condenser 34. So as to prevent the large amplitude spike of the signal between $t_3$ and $t_4$ from being stored in the condenser 34, the switch 35 is only opened from $t_4$ to $t_6$, FIGURE 9(*g*). Between $t_4$ and $t_6$ the selected part of the output signal, shown in FIGURE 9(*h*), is applied to the condenser 34 so that the voltage across the condenser 34 is as shown in FIGURE 9(*i*) which is the integral of the signal shown in FIGURE 9(*b*), and is a measure of the quantity of magnetic material which has changed state. The voltage across the condenser 34, amplified by the amplifier 36, is passed by the switch 37, which is closed between $t_5$ and $t_6$, FIGURE 9(*j*), into the condenser 38, so that at $t_6$ the condenser 38 stores a voltage, FIGURE 9(*k*), representing that integrated in condenser 34 between $t_4$ and $t_6$. The condenser 38 maintains this level until $t_{10}$.

From $t_8$ to $t_{10}$ to the above process is repeated, but, of course this time the selected element is known to have been in the "0" state initially and, therefore, the voltage integrated on the condenser 34, FIGURE 9(*i*), between $t_9$ and $t_{11}$, may be used as a reference against which to compare the voltage in the condenser 34 at $t_6$. The switch 37 is closed at $t_{10}$, FIGURE 9(*j*), causing the voltage across the condenser 38, FIGURE 9(*k*) to represent the value attained by the condenser 34 by integration from $t_9$ to $t_{11}$ (the change in value in the integrated voltage on condenser 34 between $t_{10}$ and $t_{11}$ is negligible). If the selected element was in the "1" at $t_1$ then, as shown in FIGURE 9(*k*), the voltage across the condenser 38 will change between $t_{10}$ and $t_{11}$, which change causes a current to flow through the resistor 39 thereby setting up a voltage which is passed through the diode 40 to the amplifier 41, which produces an output signal, FIGURE 9(*l*), at the terminal 42. If, however, the selected element had been in the "0" state at $t_1$ then there would be substantially no change in the voltage across condenser 38 between $t_{10}$ and $t_{11}$, and, therefore no output pulse at terminal 42.

Both row and column drive waveforms then undergo a change of polarity at $t_{14}$ until $t_{16}$ so selected element is set to the "1" state. This change of state does not affect the amplifier 31 since the muting switch 32 was closed at $t_{13}$, FIGURE 9(*d*).

Then both row and column drive waveforms undergo a further change of polarity at $t_{16}$, tending to drive the element to the "0" state again. If the digit to be written is "0" then the change of state of the element is allowed. If, however, the digit is a "1" then the write transistor 29 is rendered conducting from $t_{15}$ to $t_{18}$, FIGURE 9(*e*), shorting the column drive current to ground so that the element does not undergo a change of state. In an alternative method of writing information into the matrix the pulse of the column drive waveform between $t_{14}$ and $t_{16}$ may be selectively suppressed.

It should be noted that because the column drive waveform rises before the row drive waveform an element is always subjected to a half strength drive before interrogation by two coincident half strength drives. This has the advantage of reducing the confusion between the states of the element because of the lack of rectangularity of the hysteresis loop of the magnetic material.

FIGURE 10 shows an arrangement which is similar to that of FIGURE 8, and is numbered similarly, except that two elements are allocated to the storage of one bit of information, one element being set to the "1" state and the other to the "0" state if the digit stored is an "0" and the other element being set to the "1" state and the one to the "0" state when the digit stored is a "1." The output signal therefore appears in push-pull at the input to the amplifier 31. Two write switches 29 are provided, one to set up the "0" digit and the other to set up the "1" digit. The integration and strobing techniques described above with reference to FIGURES 8 and 9 may, of course, be applied to the arrangement shown in FIGURE 10, but the second row drive pulse, that between $t_8$ and $t_{12}$, is not necessary since the comparison between signals representing "0" and "1" may be made between those produced simultaneously from the two elements allocated to the bit of information.

So as to improve discrimination between selected and unselected elements, especially with materials having a poor magnetic loop, the column control circuit 22 may be arranged to apply a drive of one polarity to the selected column and an equal drive of opposite polarity to the remaining columns. Together with this technique the row drive may be increased by a factor of 2 in amplitude without destroying the information in unselected elements, with the result that the selected element will have more drive applied to it. Furthermore, the row drive waveform, FIGURE 9(*b*), may include a full strength negative pulse between $t_7$ and $t_8$, which in conjunction with the column drive waveform has the effect of a half strength "set" flux on the selected element, so that the output signal obtained from the matrix 20 in response to the row drive pulse between $t_8$ and $t_{12}$ is equal to that which would have been obtained between $t_3$ and $t_7$ if the element had been in the "0" state initially.

Using the circuit techniques described above for reading and driving, close tolerance in coercivity, output and squareness of hysteresis loop is not essential. Also, noise due to disturbed elements is not appreciably increased by the size of the planes.

It should be noted that the magnetic material surrounds the conductors completely and therefore can be made very thick, without fear of demagnetisation due to end effects; a strong signal can therefore be obtained; it is possible therefore to achieve large packing densities by this technique. If it is to be assumed that the conductor with its flange is less than .01" wide, packing densities as high as $10^4$ "bits" to the square inch could be achieved, i.e., 1 million "bits" may be stored on a ten inch square glass plate. A drive current of around 50 milliamps has been found to be satisfactory in one example of a store.

It will be appreciated that the circuit arrangements described above with reference to FIGURES 8, 9 and 10 may equally well be applied to a magnetic core store of conventional type or any other type of store in which the coincidence of two currents or voltages is needed to interrogate the elements of the store.

In the following claims, except where it is clear that it is otherwise intended, the definition of the arrangement of the storage elements as being in rows and columns relates to the electrical relationship between the elements and not necessarily to their physical disposition.

What I claim is:

1. A data storage device comprising an array of magnetic storage elements in rows and columns, a set of row conductors each for a respective row of the array and magnetically coupled to the elements of that row, a set of column conductors each for a respective column of the array and coupled to the elements of that column, means for applying a first electrical pulse to a selected column conductor, means for applying a second concurrent electrical pulse to a selected row conductor, each said storage element and the magnitudes of said first and second electrical pulses being so chosen that only on the co-incident presence of said first and second pulses respectively on the row and column conductors magnetically coupled to a storage element can the magnetic flux due to the magnetisation of that storage element linking with the selected column conductor be substantially changed, and means connected to said column conductors to derive therefrom an output signal induced in the selected column conductor in response to a substantial change in the magnetic flux linking therewith due to the magnetisation of the element coupled to the selected conductors and produced by the presence of both pulses, the pulses being so timed that the leading edge of the second pulse is delayed relative to the leading edge of the first pulse so that the voltage on the selected column conductor can have attained its steady state when said change of magnetic flux occurs.

2. A data storage device comprising an array of storage elements arranged in rows and columns, a set of row conductors one for each row of the array, a set of column conductors one for each column of the array, means for applying a first electrical waveform to a selected column conductor, means for applying a second electrical waveform to a selected row conductor, said first electrical waveform including a pulse which at least partly overlaps a pulse included in said second electrical waveform, each storage element being such that only in response to the coincident presence of said overlapping pulses in the respective row and column conductors the element can produce an output signal indicative of information stored in the element, an output conductor, and a plurality of gates, one for each column, connected to receive output signals from the elements of the respective column and having output connections connected to said output conductor which is common to the gates, said gates being connected so that at times dependent on said first electrical waveform, one gate only is opened to couple the elements of the selected column to the output conductor so that said output signal is applied to said output conductor undisturbed by unwanted signals from elements of other columns.

3. A device according to claim 2 in which said elements are magnetic having respective row and column conductors magnetically coupled therewith, and said output signals are induced in conductors by changes in the magnetic state of the elements.

4. A device according to claim 2 in which a pair of elements are arranged to store the information which can be stored in a single element, one element of the pair storing the information and the other element of the pair storing complementary information, means being provided for interrogating a pair of elements simultaneously and comparing the signals derived therefrom.

5. A device according to claim 2 in which said gates are operated in response to said first electrical waveform.

6. A device according to claim 5 in which said pulses are so timed that the leading edge of the pulse of the second waveform is delayed relative to the leading edge of the pulse of the first waveform sufficiently to allow any disturbance of storage elements in the selected column due to said first waveform substantially to subside before the pulse of the second waveform is applied.

7. A data storage device comprising an array of storage elements arranged in rows and columns, a set of row conductors one for each row of the array, a set of column conductors one for each column of the array, means for applying a first electrical waveform to selected column conductor, means for applying a second electrical waveform to a selected row conductor, said first electrical waveform including a pulse which at least partly overlaps a pulse included in said second electrical waveform, said pulses being so timed that the leading edge of the pulse of the second waveform is delayed relative to the leading edge of the pulse of the first waveform sufficiently to allow any disturbance of the storage elements due to said first waveform substantially to subside before the pulse of the second waveform is applied, each storage element being such that only in response to the co-incident presence of said overlapping pulses in the respective row and column conductors can the element produce an output signal indicative of information stored in the element, an output conductor, and means including gates operated in response to said first electrical waveform and respectively connected from the column conductors to said output conductor, so that the selected column conductor is coupled to the output conductor but the other column conductors of the array are not coupled to the output conductor at such time that said output signal is applied to said output conductor undisturbed by unwanted signals from elements of other columns.

8. A device according to claim 7 in which said column conductors each include individual resistors and said gates comprise a plurality of diodes, one connected from each column conductor to said output conductor, the same electrode of each diode being connected to said output conductor so that a potential derived from said first electrical waveform via the diode connected to the selected column conductor changes the potential of said output conductor so as to render non-conducting the diodes connected to the column conductors other than the selected one.

9. A device according to claim 8 in which said first and second electrical waveforms each comprise two further pulses, the first of said further pulses being of opposite polarity to the first mentioned pulse of the respective waveform, and the second of said further pulses being of the same polarity as the first mentioned pulse of the respective waveform, the pulses included in a signal being of substantially the same amplitude, and means being provided for selectively grounding said output conductor coincidently with said second further pulses in response to information to be written into a storage element.

10. A device according to claim 8 comprising an amplifier having input and output terminals and means for muting the response of said amplifier to the start of the said first electrical waveform.

11. A device according to claim 10 comprising a condenser connected from said output conductor to an input terminal of said amplifier, said muting means comprising a switch connected from said input terminal to ground.

12. A device according to claim 11 comprising means for integrating a signal derived from said amplifier for a period during the coincident presence of the pulses of said first and second electrical waveforms, said period starting after the beginning of the pulse of said second electrical waveform so that substantially the only signals integrated from said amplifier are those which are due to a change in magnetic state of an element in response to the coincident presence of the pulses of said first and second electrical waveforms.

13. A device according to claim 12 in which said first electrical waveform comprises a pulse of extended duration, said second electrical waveform comprises first and second pulses of the same polarity and a pulse of opposite polarity between said first and second pulses, all of which occur during said extended pulse, means being provided for comparing one with the other, the signals integrated by said integrating means in response to said first and second pulses.

14. A device according to claim 13 in which said comparing means comprises a series arrangement of a condenser and a switch, connections for applying the output of said integrating means across said series arrangement, means for closing the switch of said series arrangement, a first time to sample the output of said integrating means in response to said first pulse, and a second time the sample of the output of said integrating means in response to said second pulse, and means for detecting a voltage change on the condenser of said arrangement on the second closing of the switch.

15. A data storage device comprising an array of magnetic storage elements arranged in rows and columns, a set of row conductors one for each row of the array and magnetically coupled to the elements of the respective row a set of column conductors one for each column of the array and magnetically coupled to the elements of the respective column, means for applying a first electrical waveform to a selected column conductor means for applying a second electrical waveform to a second row conductor, said first electrical waveform including a pulse which at least partly overlaps a pulse included in said second electrical waveform, each storage element being such that only in response to the co-incident presence of said overlapping pulses in the row and column conductors coupled to the element can the element undergo a change in magnetic state and induce in a conductor coupled to the element an output signal indicative of information stored in the elements, an output conductor, and means including gates operated in timed relationship with said waveforms to couple said output conductor to the elements of the selected column but not of other columns of the array at such time that said output signal is applied to said output conductor by unwanted signals from elements of other columns, wherein, each of said row and column conductors having associated therewith at least one channel section element of magnetic material, said sets of conductors being maintained in proximity with but insulated from one another so that said elements from substantially closed magnetic circuits surrounding the respective conductors of the sets, the magnetic circuit being completed by coupling between the sides of the channels of one set with the sides of the channels of the other set.

16. A device according to claim 15 comprising two sheets of non-magnetic material, a plurality of sections of film of uniaxially anisotropic magnetic material formed on a surface of each said sheet of insulating material, and a portion of conductor and two portions of magnetic material, one on each side of the portions of conductors, on each section of magnetic film so as to comprise a plurality of channel section elements, said sheets being disposed with said sections of film on one sheet facing the sections of film on the other sheet.

17. A device according to claim 15 comprising two sheets of non-magnetic material having grooves formed therein, individual conductors lying in said grooves, one to each groove, a layer of magnetic material deposited between said conductors and the walls of said grooves so as to form a plurality of channel section elements, said elements having longitudinal flanges, said sheets being maintained in proximity with the grooved sides facing so that the channel section element in each groove of one sheet is magnetically coupled to the elements in all the grooves of the other sheet by said flanges.

18. A device according to claim 17 wherein the grooves of each sheet are substantially straight and parallel to one another, said sheets being so disposed that the grooves on one sheet are approximately at right angles to the grooves of the other sheet, and the magnetic material is uniaxially anisotropic having an easy axis of magnetisation diagonal to the grooves so that the easy axis of magnetisation of one sheet is substantially parallel to the easy axis of magnetisation of the other sheet.

19. A data storage device comprising an array of storage elements arranged in rows and columns, a set of row conductors one for each row of the array, a set of column conductors one for each column of the array, means for applying a first electrical waveform to a selected column conductor, means for applying said first electrical waveform with inverse polarity to the column conductors other than the selected one, means for applying a second electrical waveform to a selected row conductor, said first electrical waveform including a pulse which at least partly overlaps a pulse included in said second electrical waveform, each storage elements being such that only in response to the co-incident presence of said overlapping pulses in the respective row and column conductors the element can produce an output signal indicative of inforamtion stored in the element, an output conductor, and means including gates operated in timed relationship with said waveforms to couple said output conductor to the elements of the selected column but not of other columns of the array at such time that said output signal is applied to said output conductor undisturbed by unwanted signals from elements of other columns.

20. A data storage device comprising two face to face non-magnetic plates having grooves formed in their facing surfaces, the grooves on one side crossing the grooves on the other, two sets of conductors, each conductor of each set being positioned in one elongated channel section element of magnetic material lying in a respective one of said grooves, said sets of conductors being in proximity with, but insulated from one another so that conductors of one set cross conductors of the other set and at the crossing points said elements form substantially closed magnetic circuits surrounding the respective conductors of the sets, the magnetic circuits being closed by coupling between the sides of the channels of one set with the sides of the channels of the other set, each element associated with conductors of either set crossing and being magnetically coupled with a plurality of elements associated mith conductors of the other set.

21. A data storage device comprising two sheets of non-magnetic material having grooves formed therein, individual conductors lying in said grooves, one to each groove, and a layer of magnetic material deposited between said conductors and the walls of said grooves so as to form a plurality of channel section elements, said elements having longitudinal flanges, said sheets being maintained in proximity with the grooved sides facing and the grooves on one sheet crossing the grooves on the other sheet, so that the channel section element in each groove of one sheet is magnetically coupled to the elements in all the grooves of the other sheet by said flanges to form at the crossings of the channel section elements substantially closed magnetic circuits surrounding the conductors in the respective grooves, means being provided to insulate the conductors from one another.

References Cited

UNITED STATES PATENTS

| | | | |
|---|---|---|---|
| 3,213,430 | 10/1965 | Oshima et al. | 340—174 |
| 3,229,266 | 1/1966 | Rajchman | 340—174 |
| 3,100,295 | 8/1963 | Schweizerhof | 340—174 |
| 3,115,619 | 12/1963 | Barrett | 340—174 |
| 3,191,163 | 6/1965 | Crawford | 340—174 |
| 3,274,570 | 9/1966 | Brekne | 340—174 |
| 3,231,874 | 1/1966 | James | 340—174 |

BERNARD KONICK, *Primary Examiner.*

M. S. GITTES, G. LIEBERSTEIN, *Assistant Examiners.*